United States Patent [19]

Goellner

[11] Patent Number: 5,634,753

[45] Date of Patent: Jun. 3, 1997

[54] ADJUSTABLE LOCK NUT

[75] Inventor: Willy J. Goellner, Rockford, Ill.

[73] Assignee: Advanced Machine & Engineering Co., Rockford, Ill.

[21] Appl. No.: 608,724

[22] Filed: Feb. 29, 1996

[51] Int. Cl.[6] .................................................. F16B 39/22
[52] U.S. Cl. ........................ 411/288; 411/290; 411/291
[58] Field of Search ................................ 411/193, 315,
411/319, 333, 335, 349, 393, 432, 433,
937, 937.2, 938, 940, 965, 967, 285–291

[56] References Cited

U.S. PATENT DOCUMENTS

| | | | |
|---|---|---|---|
| 609,144 | 8/1898 | Goddin | 411/290 |
| 735,992 | 8/1903 | Martin | 411/290 |
| 1,111,732 | 9/1914 | Breault | 411/940 |
| 1,202,678 | 10/1916 | Curry | 411/940 |
| 1,406,065 | 2/1922 | Norwood | 411/285 |
| 3,316,795 | 5/1967 | Tann | 411/432 |
| 3,385,339 | 5/1968 | Dahl | 411/288 |
| 3,667,525 | 6/1972 | Spieth | 411/937.2 |
| 4,043,693 | 8/1977 | Hunt . | |
| 4,086,946 | 5/1978 | Keen . | |
| 4,095,914 | 6/1978 | Thomsen | 411/940 |
| 4,557,652 | 12/1985 | Lundgren . | |
| 5,454,674 | 10/1995 | Eriksson . | |

FOREIGN PATENT DOCUMENTS 114185  11/1941  Australia ............................ 411/285

Primary Examiner—Steven N. Meyers
Assistant Examiner—Gary Estremsky
Attorney, Agent, or Firm—Vernon J. Pillote

[57] ABSTRACT

A lock nut comprising an internally threaded body having an internally threaded bore and one groove opening at the bore and a second groove opening at the outer surface, the grooves are axially spaced apart and configured to divide the body into first and second end ring portions and a thin axially relilient intermediate portion integral with the end portions. The body has a plurality of internally threaded openings extending inwardly from the outer surface and externally threaded secews threaded into the internally threaded openings and configured to wedge the end ring portions axially away from each other when the screws are threaded into the openings.

7 Claims, 1 Drawing Sheet

ADJUSTABLE LOCK NUT

BACKGROUND OF THE INVENTION

Threaded parts are subject to various errors during forming including errors in the thread flank angle and flank shape, and lead errors. In addition, there is an unavoidable clearance between thread connected parts so that the pitch diameter of the nut and male thread are not the same. On threads having angled flanks such as the commonly used 60 degree flank angle, the thread clearance can allow a lock nut to tilt or cock relative to the spindle or shaft and cause an end face on the lock nut to be out of square with the axis of the spindle or shaft. An out of square end face on the lock nut can cause deformation of the spindle or shaft by off-center forces and or uneven bearing preload.

Various different lock nuts have heretofore been made. Some lock nuts such as disclosed in U.S. Pat. Nos. 4,086,946 and 5,454,674, press inserts or weakened thread sections of the lock nut radially inwardly against the threads on the spindle. These lock nuts only provide locking engagement of the lock nut to the spindle or shaft at circumferentially spaced locations and do not eliminate thread clearance evenly around the entire circumference. U.S. Pat. No. 4,557,652, discloses a lock nut having two separate annular members that are interconnected by elastomeric plugs or a elastomeric ring and the two members can be foceably separated by screws threadly mounted in one of the members for adjustment parallel to the axis of the member, to separate the members for locking. Pins are provided to slidably and non-rotatably interconnect the two members, but some relative angular movement can occur due to necessary clearances between parts.

Adjustable lock nuts have also been made in one piece with one internal and one external groove dividing the lock nut into a load carrying section and a locking section, and a thin intermediate section that integrally connects the load carrying section and the locking section. As disclosed in U.S. Pat. No. 4,043,692 (FIGS. 5), the locking section is adapted to be drawn toward the load carrying section by bolts paralleling the axis of the lock nut and threaded into the load carrying section. However, such lock nuts cannot be used in applications where there is insufficient clearance at the end of the lock nut to enable access to the adjusting bolts with a suitable wrench.

SUMMARY OF THE INVENTION

An object of the present invention is to provide a adjustable lock nut having locking screws accessible from the outer circumference of the lock nut to enable use of the lock nut even in installations where there is little clearance at the end of the lock nut, and which lock nut is adjustable to align the center line of the lock nut with the male thread, and which is also adjustable to enable fine adjustment of squareness of the nut contact face.

Accordingly, the present invention provides a lock nut comprising a one-piece annular body having end faces, an outer surface and an internally threaded bore extending between the end faces, the body having one groove opening at the bore and a second groove opening at the outer surface. The first and second grooves are axially spaced apart and configured to divide the body into first and second end ring portions and a thin axially resilient intermediate portion integral with the end ring portions. The body has a plurality of internally threaded openings extending inwardly from the outer surface and intersecting the first and second ring portions, and externally threaded tapered screws threaded into the internally threaded openings and configured to wedge the end ring portions axially away from each other when the screws are threaded into the openings. The screws wedge the end ring portions apart and press the flanks of the threads on the first and second end ring portions against the flanks of the threads on the male member, and when the thread clearance is eliminated, the center line of the lock nut will align with the centerline of the male thread. Minor compensation for out of parallel components can be made by individually tightening the tapered screws.

DETAILED DESCRIPTION

Figure 1:
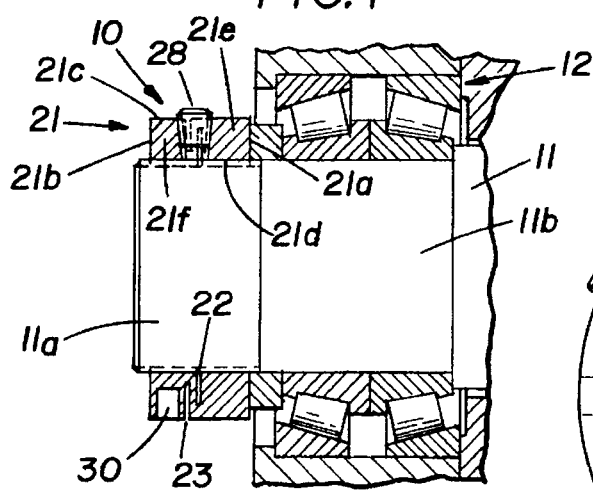
FIG. 1 is a fragmentary view illustrating the lock nut of the present invention applied to a shaft rotatably supported in a bearing on a machine.

The adjustable lock nut 10 of the present invention is generally adapted for use to adjust preload, and secure bearings and other machine components on shafts and spindles. The lock nut 10 of the present invention is herein shown mounted on an externally threaded end 11a of a shaft or spindle 11, to adjust preload on roller bearings 12 mounted on a portion 11b of the shaft or spindle 11.

The lock nut 10 comprises a one-piece annular body 21 having end faces 21a and 21b, an outer surface 21c and an internally threaded bore 21d extending between the end faces. The body has a first groove 22 intermediate the end faces and opening at the threaded bore 21d, and a second groove 23 intermediate the end faces and opening at the outer surface 21c. The first and second grooves 22 and 23 are axially spaced apart and are configured to divide the body 21 into first and second end ring portions 21e and 21f, and a thin resilient intermediate ring portion 21h that is integrally connected at an outer end of the first groove 22 to end ring portion 21e, and integrally connected at the inner end of the second groove 23 to the end ring portion 21f.

Figure 4:
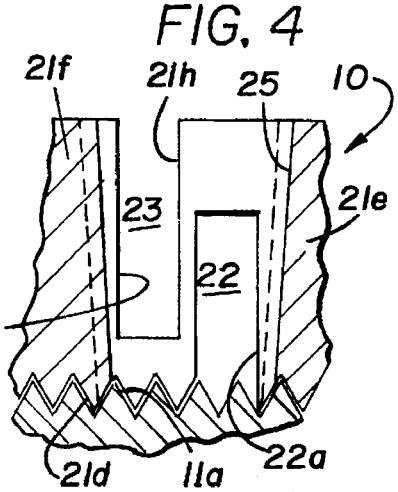
FIG. 4 is a fragmentary sectional view through the lock nut and shaft, illustrating the lock nut in an unlocked condition.

The internal threads in the threaded bore 21d in the lock nut are formed with the same pitch and flank angle as the threads 11b on the shaft portion 11a, subject to manufacturing tolerances and errors. However, clearance between the threads on the nut and the threads on the shaft is unavoidable and this is illustrated in FIG. 4 by a clearance between both flanks of the threads on the shaft and the threads on the lock nut. When the lock nut hangs loosely on the threaded shaft the lock nut will cock slightly so that end faces on the lock nut that are perpendicular to the axis of the lock nut will be slightly out of perpendicular to the axis of the shaft.

Figure 2:
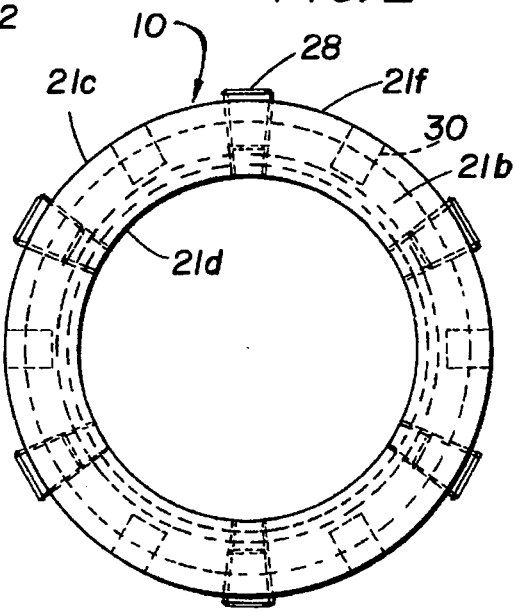
FIG. 2 is a plan view of the lock nut.
Figure 3:
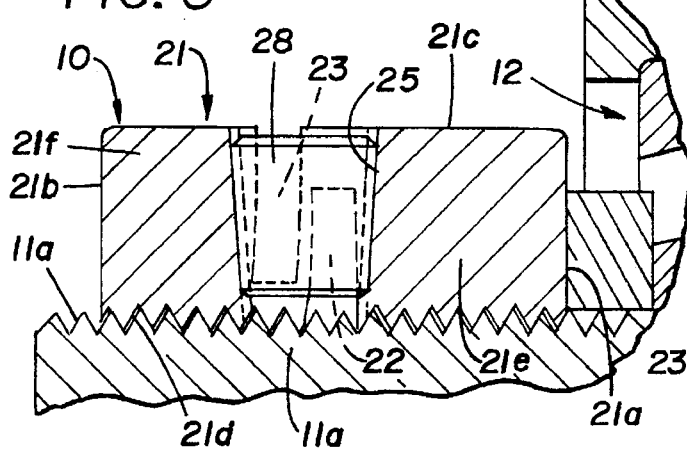
FIG. 3 is a fragmentary sectional view of the shaft and lock nut, illustrating the lock nut in a locked condition and on a larger scale than FIG. 1.

A plurality of internally threaded openings 25 are formed in the body 21 preferably after forming the internally threaded bore 21d and grooves 22 and 23 in the body at locations circumferentially spaced apart about the body and intermediate the first and second end ring portions 21e and 21f. The openings have a diameter greater than the spacing between the faces 22a and 23a (FIG 4) of the grooves 22 and 23, and such that the internally threaded openings intersect the first and second end ring portions and extend radially through the intermediate ring portion 21h and divide the latter into arcuate segments between adjacent openings. The openings 25 are spaced apart uniformally about the axis of the lock nut and, as shown in FIG. 2, six openings are provided with their axes spaced apart 60 degrees. The internally threaded openings 25 taper inwardly in a direction from the outer surface 21a of the body toward the internally threaded bore 21d and the axes of the openings extend through the thin flexible intermediate portion 21h. The openings 25 need only have a low diameter taper that is slightly greater than the clearance between the threads 21d on the nut and the threads 11a on the shaft, and preferably no greater than 10 degrees.

An externally threaded screw 28 is provided for each of the internally threaded openings 25 and, in the embodiment illustrated, the screws are tapered and have a minor diameter sufficiently larger than the minor diameter of the internally threaded openings 25 to wedge the first and second end ring portions axially away from each other when the screws are threaded into the internally threaded openings. As is conventional in the art, means such as wrench receiving sockets are provided in the outer ends of the screws and shaped to receive a suitable wrench for turning the screws into the openings. As is also conventional, means are provided in the outer surface of the lock nut and shaped to receive a suitable wrench for tightening the lock nut 10 on the threaded end 11a of the shaft or spindle. The lock nut may, for example, be provided with flats on the outside for receiving a conventional open end wrench, or grooves or sockets such as shown at in FIGS. 1 and 2, for receiving a suitable spanner wrench.

In the embodiment of FIG. 1–4, the inwardly opening groove 22 is located substantially equidistant from the end faces 21a and 21b of the lock nut and such that one end ring portion 21e has an axial length greater than the axial length of the other end ring portion 21f. The wrench receiving sockets 30 can be formed in either end ring portion and are shown in FIG. 1 located in the end ring portion 21b.

Figure 5:
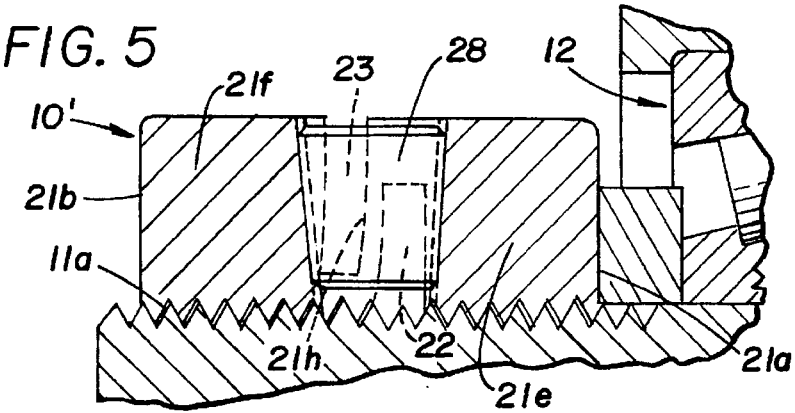
FIG. 5 is a fragmentary view illustrating a modified form of lock nut.

The lock nut embodiment 10' of FIG. 5 is substantially the same as that shown in FIGS. 1–4, and like numerals are used to designate corresponding parts. In this embodiment, the grooves 22a and 23a are located with respect to the end faces 21a and 21b of the body 21, such that the thin intermediate ring portion 21h is disposed substantially medially between the end faces 21a and 21b. With this arrangement, the end ring portions 21e and 21f have substantially the same axial length. Means for tightening the lock nut such as wrench receiving flats, notches or sockets shown at 30 in FIGS. 1 and 2, can be provided in either end ring portion.

When installing the lock nut on a shaft or spindle to adjust, preload and secure a bearing, the lock nuts are preferably first threaded on the shaft in an unexpanded condition until the lock nut is closely adjacent, but spaced from, the bearing. The locking screws are then tightened evenly around the circumference of the lock nut, while repeatedly testing the rotatability of the lock nut on the threads, until the threads on the lock nut snugly engage the threads on the shaft to align the axis of the lock nut with the axis of the threaded end 11a of the spindle. The lock nut is then turned on the shaft until an end face of the lock nut engages and applies the desired preload to the thrust washer or thrust bearing. The set screws are thereafter further tightened equally to further spread the end ring portions and provide a desired locking engagement between the threads on the lock and the threads on the shaft. Fine adjustment of the squareness of the nut contact face can be made after adjusting the preload, by tightening selected screws to force the contact face on the lock nut to adapt to the end face of the component being locked on the shaft.

The embodiments of the invention in which an exclusive property or privilege are defined as follows:

1. An adjustable lock nut adapted to be locked on a threaded element comprising a one-piece annular body having a body axis, end faces perpendicular to the body axis, a circumferential outer surface, and an internally threaded bore extending axially between the end faces, the body having a first groove intermediate the end faces and opening at said bore and a second groove intermediate said end faces and opening at said outer surface, the first and second grooves being axially spaced apart and configured to divide the body into first and second internally threaded end ring portions and a thin axially resilient intermediate ring portion integrally connected at an outer end of the first groove to the first end ring portion and at an inner end of the second groove to the second end ring portion, the annular body having a plurality of internally threaded openings each having an axis extending radially inwardly from the outer surface at locations circumferentially spaced apart about the body, the internally threaded openings being located between and intersecting the first and second end ring portions, and externally threaded screws threaded into said internally threaded openings, the internally threaded openings and the externally threaded screws being configured to wedge the first and second end ring portions axially away from each other when the externally threaded screws are turned into the internally threaded openings, said intermediate ring portion being sufficiently thin to deform and accommodate limited movement of the first and second end ring portions in relatively opposite directions.

2. A lock nut according to claim 1 wherein the internally threaded openings intersect the internally threaded bore.

3. A lock nut according to claim 1 wherein the internally threaded openings taper inwardly in a direction from the outer surface toward the internally threaded bore.

4. A lock nut according to claim 1 wherein the externally threaded screws taper inwardly toward an inner end thereof.

5. A lock nut according to claim 2 wherein the internally threaded openings taper inwardly in a direction from the outer surface toward the internally threaded bore.

6. A lock nut according the claim 1 wherein the axes of the internally threaded openings extend radially through the intermediate ring portion.

7. A lock nut according to claim 1 wherein the internally threaded openings extend through and divide the intermediate ring portion into arcuate segments.

* * * * *